US012271123B2

(12) United States Patent
Yamada

(10) Patent No.: US 12,271,123 B2
(45) Date of Patent: Apr. 8, 2025

(54) IMAGE FORMING APPARATUS

(71) Applicant: KYOCERA Document Solutions Inc., Osaka (JP)

(72) Inventor: Ryo Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/598,367

(22) Filed: Mar. 7, 2024

(65) Prior Publication Data

US 2024/0310755 A1 Sep. 19, 2024

(30) Foreign Application Priority Data

Mar. 15, 2023 (JP) ................................ 2023-040522

(51) Int. Cl.
*G03G 15/00* (2006.01)
*G03G 9/107* (2006.01)
*G03G 15/08* (2006.01)

(52) U.S. Cl.
CPC ......... *G03G 15/0889* (2013.01); *G03G 9/107* (2013.01); *G03G 15/0865* (2013.01); *G03G 15/5004* (2013.01); *G03G 2215/00776* (2013.01)

(58) Field of Classification Search
CPC ........... G03G 15/0865; G03G 15/0889; G03G 15/5004; G03G 9/107; G03G 21/203
USPC .............................................. 399/44, 53, 55
See application file for complete search history.

(56) References Cited

U.S. PATENT DOCUMENTS

2013/0251387 A1* 9/2013 Tanaka ................ G03G 21/203 399/44

FOREIGN PATENT DOCUMENTS

JP 2005-099260 A 4/2005
JP 2012185381 * 9/2012
JP 2017201355 * 11/2017

* cited by examiner

*Primary Examiner* — Hoan H Tran
(74) *Attorney, Agent, or Firm* — Stein IP, LLC

(57) ABSTRACT

An image forming apparatus includes an image carrying member, a charging device, an exposure device, a development device, a development voltage power supply, a humidity detection device and a controller. The exposure device exposes the surface of the image carrying member charged by the charging device to form an electrostatic latent image. The development device includes a development container which stores a developer including a toner and a developer carrying member which supplies, to the image carrying member, the toner in the developer, and develops the electrostatic latent image into a toner image. The development voltage power supply applies, to the developer carrying member, a development voltage with an alternating voltage superimposed on a direct voltage. The humidity detection device detects an absolute humidity around the development device. The controller stepwise increases the frequency of the alternating voltage as the absolute humidity detected by the humidity detection device is increased.

7 Claims, 6 Drawing Sheets

IMAGE FORMING APPARATUS

INCORPORATION BY REFERENCE

This application is based upon and claims the benefit of priority from the corresponding Japanese Patent Application No. 2023-040522, filed on Mar. 15, 2023, the entire contents of which are incorporated herein by reference.

BACKGROUND

The present disclosure relates to image forming apparatuses such as a copying machine, a printer a facsimile and a multi-functional peripheral thereof which include image carrying members, and particularly relates to an image forming apparatus which includes a development device of a two-component development system that uses a two-component developer containing a toner and a carrier.

In an image forming apparatus, an electrostatic latent image formed on an image carrying member which includes a photosensitive member and the like is developed with a development device and is visualized as a toner image. As one system for the development device as described above, a two-component development system which uses a two-component developer is adopted.

In the two-component development system, development characteristics vary significantly depending on the usage environment of the image forming apparatus and the number of sheets used. This is mainly because a developer deteriorates or the properties of the developer change depending on the usage environment and the number of sheets used. As the developer deteriorates, the charging capacity of the developer is reduced, and thus the charge of the developer on a developer carrying member becomes uneven or is lowered. Consequently, a failure such as image fog or drum ghost (history development) occurs on an image.

SUMMARY

An image forming apparatus according to an aspect of the present disclosure includes an image carrying member, a charging device, an exposure device, a development device, a development voltage power supply, a humidity detection device and a controller. In the image carrying member, a photosensitive layer is formed on its surface. The charging device charges the surface of the image carrying member. The exposure device exposes the surface of the image carrying member charged by the charging device to form an electrostatic latent image with charging attenuated. The development device includes a development container which stores a developer including a toner and a developer carrying member which is arranged in the development container and supplies, to the image carrying member, the toner in the developer stored in the development container, and develops the electrostatic latent image into a toner image. The development voltage power supply applies, to the developer carrying member, a development voltage with an alternating voltage superimposed on a direct voltage. The humidity detection device detects an absolute humidity around the development device. The controller controls the development voltage power supply. The controller stepwise increases the frequency of the alternating voltage as the absolute humidity detected by the humidity detection device is increased.

DETAILED DESCRIPTION

Figure 1:
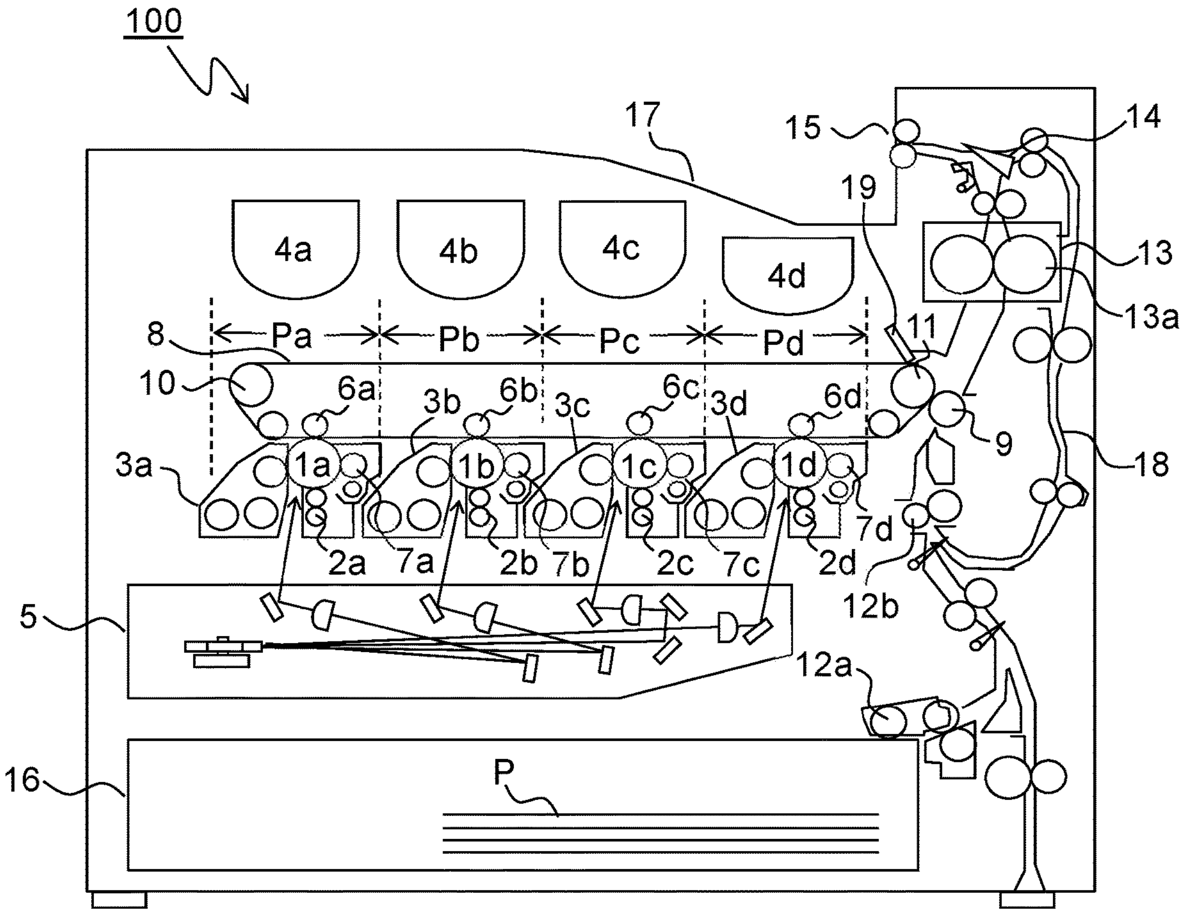
FIG. 1 is a schematic configuration view of a color printer according to an embodiment of the present disclosure.

An embodiment of the present disclosure will be described below with reference to drawings. FIG. 1 is a schematic cross-sectional view of an image forming apparatus according to the embodiment of the present disclosure, and shows a tandem-type color printer here. Inside the main body of the color printer 100, four image formation units Pa, Pb, Pc and Pd are provided sequentially from an upstream side in a conveyance direction (the left side in FIG. 1). These image formation units Pa to Pd are provided according to images of four different colors (yellow, magenta, cyan and black), and the image formation units Pa to Pd each perform steps of charging, exposure, development and transfer to sequentially form images of yellow, magenta, cyan and black.

In the image formation units Pa to Pd, photosensitive drums 1*a*, 1*b*, 1*c* and 1*d* are provided which carry visible images (toner images) of the colors. Furthermore, an intermediate transfer belt 8 which is rotated in a counterclockwise direction in FIG. 1 is provided adjacent to the image formation units Pa to Pd. The intermediate transfer belt 8 is stretched around a tension roller 10 on the upstream side and a drive roller 11 on the downstream side, and on the downstream side of the image formation unit Pd in the direction of rotation of the intermediate transfer belt 8, a blade-shaped belt cleaner 19 which is opposite the drive roller 11 through the intermediate transfer belt 8 is arranged.

When image data is input from a host device such as a personal computer, the rotation of the photosensitive drums 1*a* to 1*d* is first started by a main motor 40 (see FIG. 3), and the surfaces of the photosensitive drums 1*a* to 1*d* are evenly charged by charging devices 2*a* to 2*d*. Then, by an exposure device 5, light is applied according to the image data, and thus electrostatic latent images corresponding to the image data are formed on the photosensitive drums 1*a* to 1*d*. In development devices 3*a* to 3*d*, predetermined amounts of two-component developers (hereinafter also simply referred to as the developers) which include the toners of the colors of yellow, magenta, cyan and black are charged by toner containers 4*a* to 4*d*, and the toners in the developers are supplied on the photosensitive drums 1*a* to 1*d* by the development devices 3*a* to 3*d* and are electrostatically adhered thereto. In this way, toner images corresponding to the electrostatic latent images formed by the exposure from the exposure device 5 are formed.

Then, by primary transfer rollers 6*a* to 6*d*, an electric field is applied at a predetermined transfer voltage between the primary transfer rollers 6a to 6d and the photosensitive drums 1a to 1d, and the toner images of yellow, magenta, cyan and black on the photosensitive drums 1a to 1d are primarily transferred on the intermediate transfer belt 8. The toners and the like left on the surfaces of the photosensitive drums 1a to 1d after the primary transfer are removed with cleaning devices 7a to 7d.

Transfer sheets P to which the toner images are transferred are stored in a sheet cassette 16 arranged in a lower portion of the color printer 100, and a transfer sheet P is conveyed into a nip portion (secondary transfer nip portion) between the secondary transfer roller 9 provided adjacent to the intermediate transfer belt 8 and the intermediate transfer belt 8 via a paper feed roller 12a and a registration roller pair 12b with predetermined timing. The transfer sheet P to which the toner images have been transferred is conveyed to a fixing unit 13.

The transfer sheet P which has been transferred to the fixing unit 13 is heated and pressurized by a fixing roller pair 13a, and thus the toner images are fixed to the surface of the transfer sheet P, with the result that a predetermined full color image is formed. The transfer sheet P on which the full color image has been formed is ejected to an ejection tray 17 by an ejection roller pair 15 without being processed (or after the transfer sheet P is distributed by a branch portion 14 to a reverse conveyance path 18 and images are formed on both sides).

Figure 2:
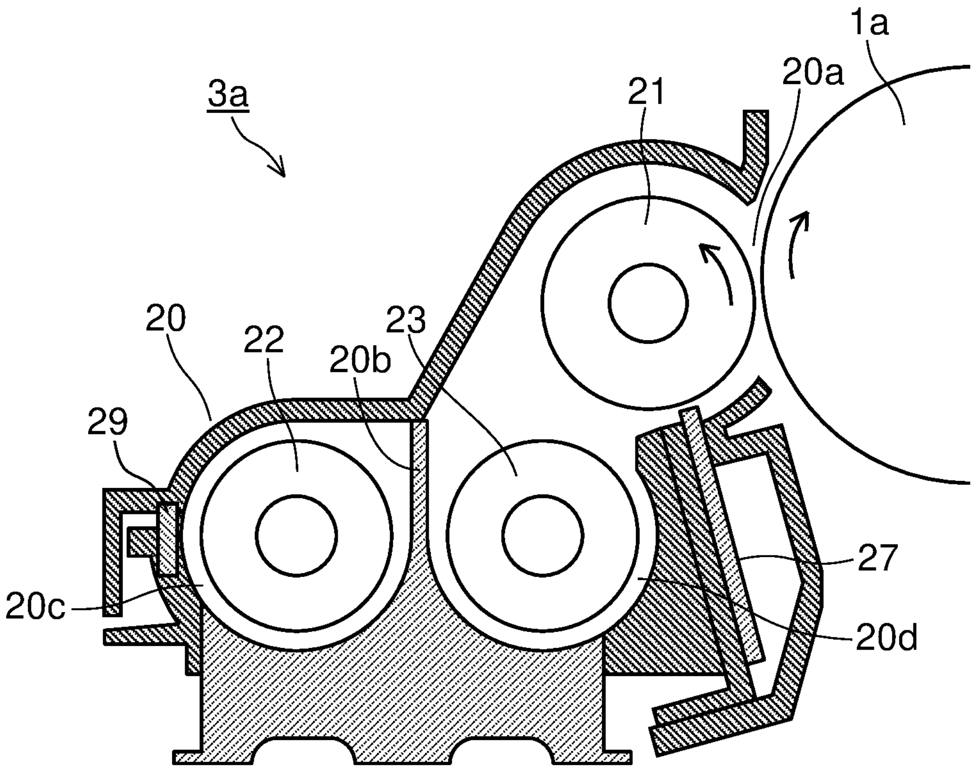
FIG. 2 is a side cross-sectional view of a development device incorporated in the color printer.

FIG. 2 is a side cross-sectional view of the development device 3a incorporated in the color printer 100. Although in the following description, the development device 3a arranged in the image formation unit Pa in FIG. 1 is illustrated, the same is basically true for the configurations of the development devices 3b to 3d arranged in the image formation units Pb to Pd, and thus the description thereof is omitted.

As shown in FIG. 2, the development device 3a includes a development container 20 in which the two-component developer (hereinafter also simply referred to as the developer) containing a magnetic carrier and the toner is stored. The development container 20 is partitioned into a first conveyance chamber 20c and a second conveyance chamber 20d by a partition wall 20b. In the first conveyance chamber 20c and the second conveyance chamber 20d, a stirring conveyance screw 22 and a supply conveyance screw 23 for mixing the toner supplied from the toner container 4a (see FIG. 1) with the magnetic carrier and stirring and charging the toner are rotatably provided, respectively.

While the developer is being stirred by the stirring conveyance screw 22 and the supply conveyance screw 23, the developer is conveyed in an axial direction (direction perpendicular to the plane of FIG. 2), and are circulated between the first conveyance chamber 20c and the second conveyance chamber 20d via communication portions (not shown) formed at both ends of the partition wall 20b. In other words, a circulation path for the developer is formed in the development container 20 by the first conveyance chamber 20c, the second conveyance chamber 20d and the communication portions.

The development container 20 is provided to extend upward to the right in FIG. 2, and a development roller 21 is arranged in a place located upward to the right relative to the supply conveyance screw 23 in the development container 20. A part of the outer circumferential surface of the development roller 21 is exposed from the opening 20a of the development container 20 and is opposite the photosensitive drum 1a through a predetermined clearance (development gap). The development roller 21 is rotated in a counterclockwise direction in FIG. 2 (trail-rotated in a position opposite the photosensitive drum 1a).

The development roller 21 includes a cylindrical development sleeve which is rotated in the counterclockwise direction in FIG. 2 and a magnet (not shown) which is fixed in the development sleeve and includes a plurality of magnetic poles. Although here, the development sleeve having a knurled surface is used, a development sleeve in which a large number of recesses (dimples) are formed in a surface, a development sleeve having a blasted surface, a development sleeve in which recesses are formed and its surface is knurled and blasted or a plated development sleeve can be used. A development voltage with an alternating voltage Vac superimposed on a direct voltage Vdc is applied to the development roller 21 from a development voltage power supply 53 via a voltage control circuit 55 (see FIG. 3 for both of them).

A regulation blade 27 is attached to the development container 20 along the longitudinal direction of the development roller 21 (direction perpendicular to the plane of FIG. 2). A slight clearance (gap) is formed between a tip of the regulation blade 27 and the outer circumferential surface of the development roller 21. In the present embodiment, as the regulation blade 27, a magnetic blade made of stainless steel (SUS430) is used.

On the side surface of the first conveyance chamber 20c, a toner concentration sensor 29 is arranged opposite the stirring conveyance screw 22. The toner concentration sensor 29 detects the concentration of the toner in the developer in the development container 20 (mixing ratio of the toner to the carrier in the developer; T/C). As the toner concentration sensor 29, for example, a magnetic permeability sensor is used which detects the magnetic permeability of the two-component developer of the toner and the magnetic carrier in the development container 20. The toner in the toner container 4a (see FIG. 1) is supplied into the development container 20 according to the concentration of the toner detected by the toner concentration sensor 29 via a developer supply port (not shown).

A magnetic field in the direction of attraction between the regulation pole of the magnet and the regulation blade 27 is generated, and thus a magnetic brush in which the developer is continuous between the regulation blade 27 and the development roller 21 is formed, with the result that the thickness of a layer is regulated to a desired height by the passage of the magnetic brush through the regulation blade 27. Thereafter, when the development roller 21 is rotated in the counterclockwise direction, the magnetic brush is moved to the opposite region (development region) of the development roller 21 and the photosensitive drum 1a. Then, a magnetic field in the direction of attraction between the photosensitive drum 1a and the development roller 21 is provided by the main pole of the magnet, and thus the magnetic brush makes contact with the surface of the photosensitive drum 1a to develop the electrostatic latent image.

When the development roller 21 is further rotated in the counterclockwise direction, a magnetic field in a direction along the outer circumferential surface of the development roller 21 is provided by the conveyance pole of the magnet at this time, and thus the developer which is not used for the formation of the toner image is collected on the development roller 21 together with the magnetic brush. Furthermore, the magnetic brush is separated from the development roller 21 to fall into the second conveyance chamber 20d at a peeling pole which has a different polarity from the conveyance pole. Then, after stirring and conveyance are performed by the supply conveyance screw 23, a magnetic brush is formed again on the development roller 21 by the magnetic field of the regulation pole.

Figure 3:
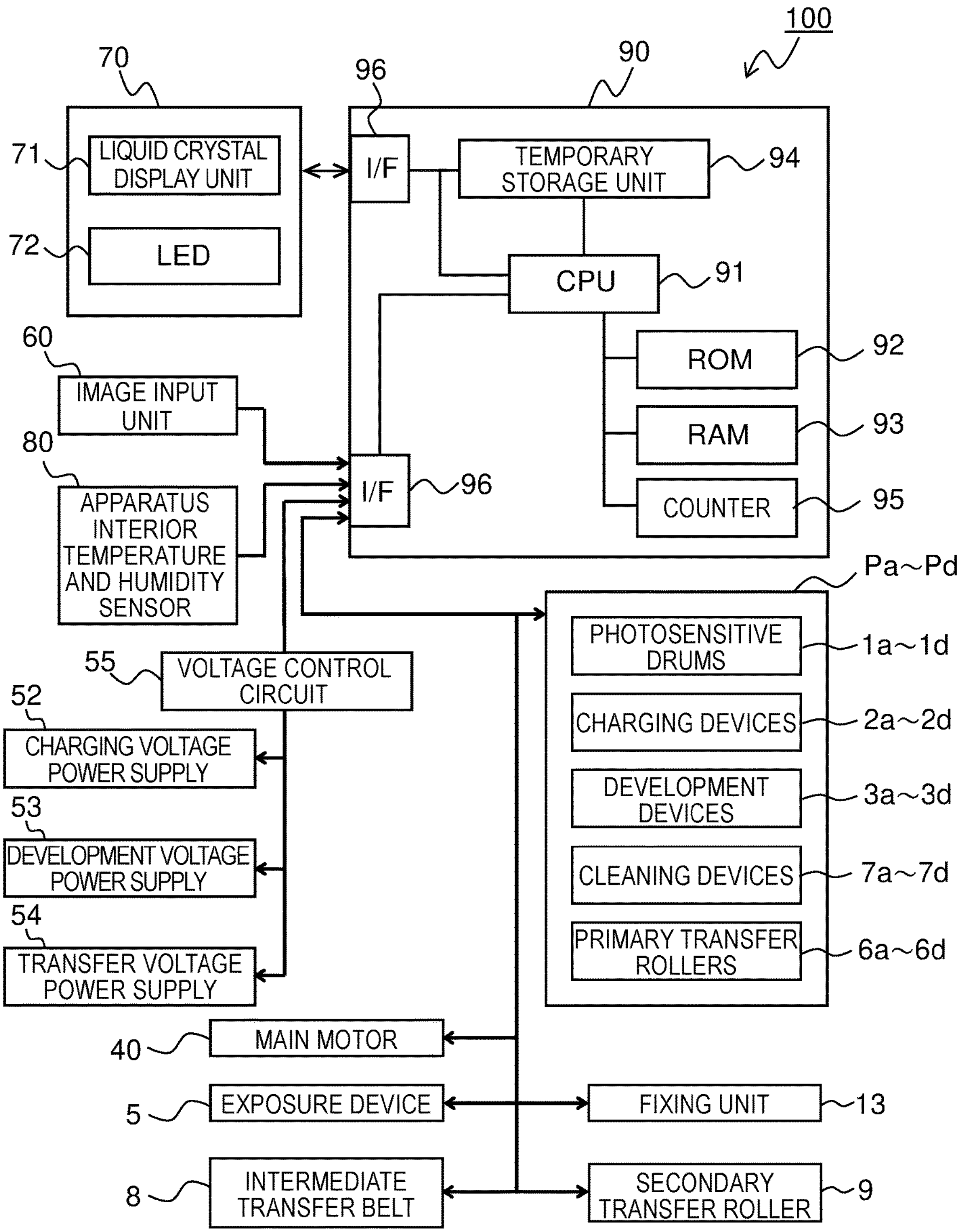
FIG. 3 is a block diagram showing an example of a control path used in the color printer.

FIG. 3 is a block diagram showing an example of a control path used in the color printer 100. Since various types of control are performed on the parts of the color printer 100 when the color printer 100 is used, the control path for the entire color printer 100 is complicated. Hence, here, parts of the control path which are necessary for implementation of the present disclosure will be mainly described.

The voltage control circuit 55 is connected to a charging voltage power supply 52, a development voltage power supply 53 and a transfer voltage power supply 54, and operates these power supplies by output signals from a controller 90, and by control signals from the voltage control circuit 55, the charging voltage power supply 52 applies a predetermined voltage to charging rollers in the charging devices 2*a* to 2*d*, the development voltage power supply 53 applies a predetermined voltage to the development rollers 21 in the development devices 3*a* to 3*d* and the transfer voltage power supply 54 applies a predetermined voltage to the primary transfer rollers 6*a* to 6*d* and the secondary transfer roller 9.

An image input unit 60 is a reception unit which receives image data transmitted from a personal computer or the like to the color printer 100. Image signals input from the image input unit 60 are converted to digital signals and are thereafter fed out to a temporary storage unit 94.

In an operation unit 70, a liquid crystal display unit 71 and LEDs 72 indicating various states are provided, and the state of the color printer 100 is indicated, and the statue of image formation and the number of sheets printed are displayed. Various types of settings for the color printer 100 are made by the print driver of the personal computer.

Furthermore, in the operation unit 70, a start button with which a user provides an instruction to start image formation, a stop/clear button which is used, for example, to stop the image formation, a reset button which is used to bring various types of settings for the color printer 100 into default states and the like are provided.

An apparatus interior temperature and humidity sensor 80 detects a temperature and a humidity inside the color printer 100, and particularly, a temperature and a humidity around the development devices 3*a* to 3*d*, and is arranged in the vicinity of the image formation units Pa to Pd.

The controller 90 includes at least a CPU (Central Processing Unit) 91 which serves as a central processor, a ROM (Read Only Memory) 92 which is a read-only storage unit, a RAM (Random Access Memory) 93 which is a read/write storage unit, the temporary storage unit 94 which temporarily stores the image data and the like, a counter 95 and a plurality of (here, two) I/Fs (interfaces) 96 which transmit the control signals to the devices in the color printer 100 and receive input signals from an operation unit 70. The controller 90 can be arranged in any location inside the main body of the color printer 100.

The ROM 92 stores data and the like which are not changed during use of the color printer 100 such as control programs for the color printer 100 and numerical values necessary for control. The RAM 93 stores necessary data which is generated under control of the color printer 100, data which is temporarily necessary for control of the color printer 100 and the like. The RAM 93 (or the ROM 92) also stores relationships between an absolute humidity, a cumulative drive distance and a frequency when the frequency of the alternating voltage Vac of the development voltage which is applied to the development rollers 21 of the development devices 3*a* to 3*d* based on the absolute humidity and the cumulative drive distance of the photosensitive drums 1*a* to 1*d* described later is changed. The temporary storage unit 94 temporarily stores the image signals which are input from the image input unit 60 and are converted to digital signals. The counter 95 cumulates and counts the number of sheets printed.

The controller 90 transmits the control signals to the parts and devices in the color printer 100 from the CPU 91 via the I/Fs 96. The parts and devices transmit signals indicating the states thereof and the input signals to the CPU 91 via the I/Fs 96. Examples of the parts and devices controlled by the controller 90 include the image formation units Pa to Pd, the exposure device 5, the intermediate transfer belt 8, the secondary transfer roller 9, the fixing unit 13, the voltage control circuit 55, the image input unit 60, the operation unit 70, the apparatus interior temperature and humidity sensor 80 and the like.

As described above, the temperature and humidity inside the color printer 100 are changed linearly with a printing operation. Hence, development characteristics of the development devices 3*a* to 3*d* are significantly changed each time a sheet is printed, and an image failure such as image fog or drum ghost may occur. The image failure as described above is affected by the state of deterioration of the photosensitive drums 1*a* to 1*d*.

In the color printer 100 of the present embodiment, the frequency of the alternating voltage Vac applied to the development rollers 21 in the development devices 3*a* to 3*d* is changed for each printed sheet according to a change in the temperature and humidity and the cumulative drive distance of the photosensitive drums 1*a* to 1*d* each time a print job is performed.

Figure 4:
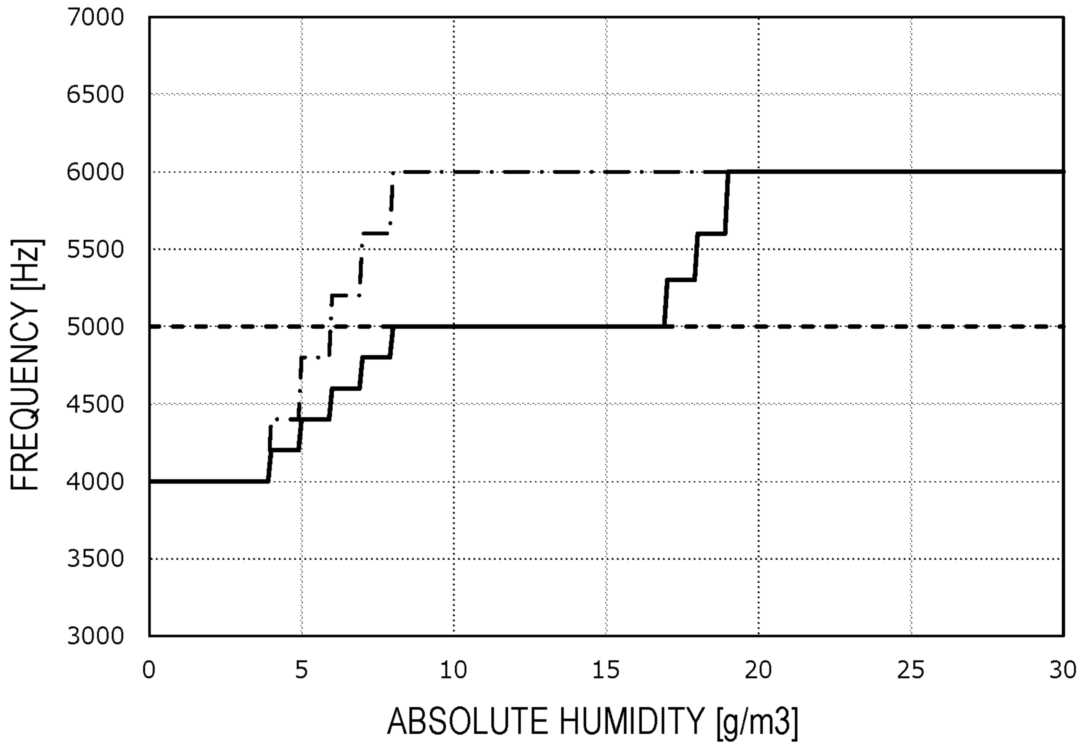
FIG. 4 is a graph showing an example of a relationship between an absolute humidity and the frequency of an alternating component of a development voltage which is used for controlling the development voltage in the color printer of the present embodiment.

FIG. 4 is a graph showing an example of a relationship between the absolute humidity and the frequency of the alternating voltage Vac which is used for controlling the development voltage in the color printer 100. In FIG. 4, conventional control is indicated by a dashed line in which the frequency of the alternating voltage Vac is not changed from the optimal frequency (hereinafter referred to as a reference frequency) for preventing the occurrence of image fog and drum ghost regardless of the absolute humidity under an environment of normal humidity. In the control of the present embodiment which stepwise increases the frequency of the alternating voltage Vac as the absolute humidity is increased, a case (first control) where the cumulative drive distance of the photosensitive drums 1*a* to 1*d* is less than a predetermined distance (62500 m) is indicated by solid lines, and a case (second control) where the cumulative drive distance of the photosensitive drums 1*a* to 1*d* is equal to or greater than the predetermined distance (62500 m) is indicated by alternate long and short dashed lines.

When the absolute humidity is high, the charging capacity of the developers in the development devices 3*a* to 3*d* is reduced, and thus the developability thereof is lowered, with the result that image fog easily occurs. On the other hand, when the absolute humidity is low, the surface potential of the photosensitive drums 1*a* to 1*d* is unstable, with the result that drum ghost easily occurs. Hence, in the conventional control in which the frequency of the alternating voltage Vac is fixed to the reference frequency (here, 5000 Hz), when the absolute humidity is high, image fog may occur whereas when the absolute humidity is low, drum ghost may occur.

Hence, as shown in FIG. 4, when the absolute humidity is low, the frequency of the alternating voltage Vac is set to a first frequency (here, 4000 Hz) lower than the reference frequency, and as the absolute humidity is increased, the frequency of the alternating voltage Vac is stepwise increased to a second frequency (here, 6000 Hz) higher than the reference frequency. In this way, it is possible to suppress both drum ghost which easily occurs when the absolute humidity is low and image fog which easily occurs when the absolute humidity is high.

In the present embodiment, a method for changing the frequency of the alternating voltage Vac is switched between a case where the cumulative drive distance of the photosensitive drums 1*a* to 1*d* is less than the predetermined distance (6250 m) and a case where the cumulative drive distance of the photosensitive drums 1*a* to 1*d* is equal to or greater than the predetermined distance. More specifically, when the cumulative drive distance is less than the predetermined distance (first control), the frequency of the alternating voltage Vac at the absolute humidity of 4 [g/$m^3$] is set to the first frequency, and the frequency is increased by 200 Hz as the absolute humidity is increased by 1 [g/$m^3$] until the reference frequency is reached (first section). When the absolute humidity is in a range of 8 [g/$m^3$] to 17 [g/$m^3$], the frequency is maintained at the reference frequency (second section).

Furthermore, as the absolute humidity is increased from 17 [g/$m^3$] by 1 [g/$m^3$], the frequency is increased from the reference frequency by 330 Hz until the second frequency is reached (third section). Then, when the absolute humidity is equal to or greater than 19 [g/$m^3$], the frequency is maintained at the second frequency.

When the cumulative drive distance is equal to or greater than the predetermined distance (second control), the frequency of the alternating voltage Vac at the absolute humidity of 4 [g/$m^3$] is set to the first frequency, and the frequency is increased by 400 Hz as the absolute humidity is increased by 1 [g/$m^3$] until the second frequency is reached. Then, when the absolute humidity is equal to or greater than 8 [g/$m^3$], the frequency is fixed to the second frequency.

As described above, in the present embodiment, when the cumulative drive distance is less than the predetermined distance (first control), the frequency is changed in each of the first section in which the frequency is stepwise increased from the first frequency to the reference frequency, the second section in which the frequency is maintained at the reference frequency and the third section in which the frequency is stepwise increased from the reference frequency to the second frequency.

The reason is as follows. When the cumulative drive distance of the photosensitive drums 1*a* to 1*d* is short, the thickness of a photosensitive layer is large, and thus drum ghost easily deteriorates. Hence, when the frequency of the alternating voltage Vac is rapidly increased while the absolute humidity is low, drum ghost remarkably occurs. Therefore, in the first control, as compared with a case where the cumulative drive distance of the photosensitive drums 1*a* to 1*d* is long, the range of a change (range of an increase) in the frequency relative to a change in the absolute humidity is decreased, with the result that the occurrence of drum ghost is suppressed.

Furthermore, the range of a change in the frequency in the third section of the first control is increased as compared with the first section, and thus the range of a change in the frequency relative to a change in the absolute humidity in a region where the absolute humidity is low can be further decreased, with the result that it is possible to further suppress the occurrence of drum ghost.

Although in the example of the control shown in FIG. 4, as the absolute humidity is increased, the frequency is changed from the first frequency lower than the reference frequency to the second frequency higher than the reference frequency, for example, as the absolute humidity is increased, the frequency can be changed from the reference frequency to the second frequency or the frequency can be changed from the first frequency to the reference frequency. In the control in which the frequency is changed from the first frequency to the second frequency, it is possible to suppress both image fog and drum ghost most effectively.

Figure 5:
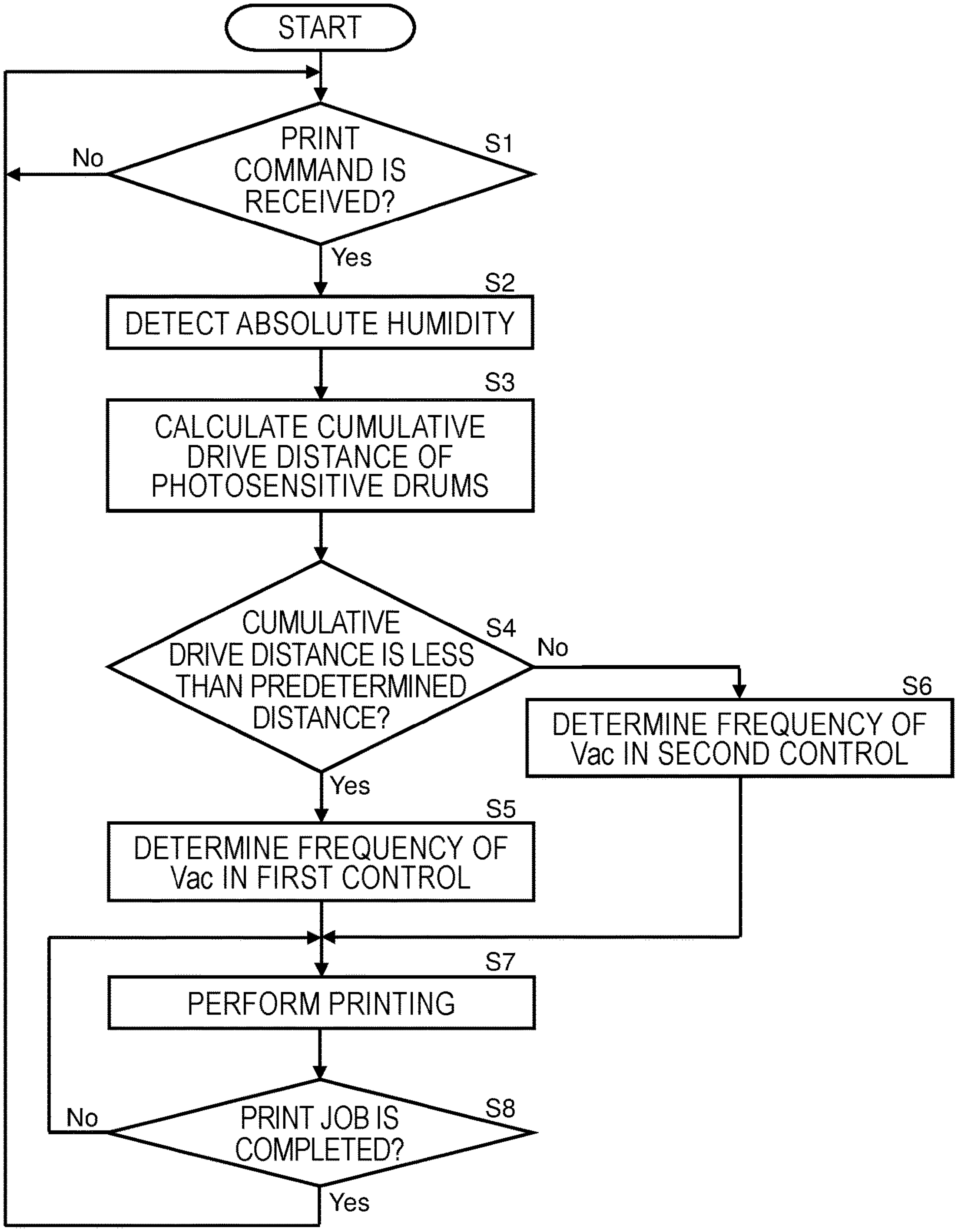
FIG. 5 is a flowchart showing an example of control of the alternating voltage Vac of the development voltage which is applied to the development rollers of development devices in the color printer.

FIG. 5 is a flowchart showing an example of control of the alternating voltage Vac of the development voltage which is applied to the development rollers 21 of the development devices 3*a* to 3*d* in the color printer 100. A procedure for controlling the alternating voltage Vac of the development devices 3*a* to 3*d* will be described with reference to FIGS. 1 to 4 as necessary along the steps of FIG. 5.

The controller 90 first determines whether or not a print command is received from a host device such as a personal computer (step S1). When the print command is not received (no in step S1), a print standby state is continued. When the print command is received (yes in step S1), the controller 90 detects the absolute humidity with the apparatus interior temperature and humidity sensor 80 (step S2).

Then, the controller 90 calculates the cumulative drive distance of the photosensitive drums 1*a* to 1*d* (step S3). The cumulative drive distance of the photosensitive drums 1*a* to 1*d* may be calculated from the external diameters and the cumulative number of rotations of the photosensitive drums 1*a* to 1*d* or may be calculated from the rotation speed (linear speed) and the cumulative drive time of the photosensitive drums 1*a* to 1*d*.

Then, the controller 90 determines whether or not the cumulative drive distance of the photosensitive drums 1*a* to 1*d* is less than the predetermined distance (for example, 62500 m) (step S4). When the cumulative drive distance is less than the predetermined distance (yes in step S4), the controller 90 performs the first control (the solid lines in FIG. 4) to determine the frequency of the alternating voltage Vac of the development voltage (step S5). On the other hand, when the cumulative drive distance is equal to or greater than the predetermined distance (no in step S4), the controller 90 performs the second control (the alternate long and short dashed lines in FIG. 4) to determine the frequency of the alternating voltage Vac of the development voltage (step S6).

Then, the controller 90 uses the frequency of the alternating voltage Vac determined in step S5 or step S6 to perform printing (step S7). Thereafter, the controller 90 determines whether or not the print job is completed (step S8), and when the print job is continued (no in step S8), the processing returns to step S7, and the printing is continued. When the print job is completed (yes in step S8), the processing returns to step S1, and the print standby state is continued.

In the example of the control shown in FIG. 5, the frequency of the alternating voltage Vac of the development voltage can be set to an appropriate frequency according to the absolute humidity which is changed linearly with the printing operation each time the print job is performed. Hence, it is possible to effectively suppress both drum ghost which easily occurs when the absolute humidity is low and image fog which easily occurs when the absolute humidity is high.

The control of the frequency of the alternating voltage Vac is changed based on the cumulative drive distance of the photosensitive drums 1*a* to 1*d*, and thus the frequency can be set to an appropriate frequency corresponding to the state of deterioration of the photosensitive drums 1*a* to 1*d*.

Specifically, when the cumulative drive distance of the photosensitive drums 1*a* to 1*d* is equal to or greater than the predetermined distance, drum ghost is unlikely to occur, and thus the control is switched to the second control in which the range of a change in the frequency of the alternating voltage Vac relative to the absolute humidity is large, with the result that the frequency when the absolute humidity is low is increased. In this way, it is possible to suppress image fog while maintaining development characteristics when the absolute humidity is low.

The present disclosure is not limited to the embodiment described above, and various changes can be made without departing from the spirit of the present disclosure. For example, although in the embodiment described above, the development devices 3*a* to 3*d* which include the development rollers 21 carrying the two-component developers as shown in FIG. 2 have been described, the present disclosure is not limited to this configuration, and can be applied to image forming apparatuses which include various development devices using two-component developers such as a development device which includes a toner supply roller for supplying only a toner in a two-component developer to the development roller 21.

Although in the embodiment described above, the image forming apparatus of the two-component development system using the two-component developer containing the magnetic carrier and the toner has been described, the present disclosure can be applied to an image forming apparatus of a one-component development system using a magnetic one-component developer formed of only magnetic toner.

Although in the embodiment described above, the description has been given using, as the example, the tandem-type color printer 100 serving as the image forming apparatus, the present disclosure can be naturally applied to, for example, monochrome and color copying machines, a digital multi-functional peripheral, a monochrome printer, a facsimile and the like. The effect of the present disclosure will be described in further detail below using Examples.

EXAMPLES

The effect of suppressing image fog and drum ghost when the frequency of the alternating voltage Vac of the development voltage was stepwise changed according to a change in humidity and the cumulative drive distance of the photosensitive drums 1*a* to 1*d* each time a print job was performed was evaluated. As a test method, the occurrence of image fog and drum ghost was evaluated in a case (Comparative Example) where the frequency of the alternating voltage Vac was not changed regardless of the absolute humidity and in a case (the present disclosure) where the frequency of the alternating voltage Vac was increased as the absolute humidity was increased.

For the case where the frequency of the alternating voltage Vac was increased as the absolute humidity was increased, the evaluation was performed on each of the control (the solid lines in FIG. 4) when the cumulative drive distance was less than the predetermined distance (62500 m) and the control (the alternate long and short dashed lines in FIG. 4) when the cumulative drive distance was equal to or greater than the predetermined distance.

As a test machine, the color printer 100 (made by KYOCERA Document Solutions Inc.) as shown in FIG. 1 was used, and a process linear speed was set to 270 [mm/sec]. The amount of developer conveyed by the development roller 21 was set to 340 [g/m$^2$], and a gap between the photosensitive drum and the development roller (DS-gap) was set to 0.34 [mm].

A potential difference (development potential difference) VO-Vdc between the surface potential VO of the photosensitive drums 1*a* to 1*d* and the direct voltage Vdc of the development voltage of the development devices 3*a* to 3*d* was set to 150 [V], Vpp (peak-to-peak value) of the alternating voltage Vac was set to 1.5 [kV], Duty was set to 50 [%] and the initial value (default) of the frequency was variably set to 5000 [Hz].

The image fog was evaluated by measuring a fog value (FD, Fog density) when a blank image was printed with an image densitometer and determining whether or not the fog value dropped below a standard value (0.015). The drum ghost was evaluated by using a test chart having a solid patch image at the beginning part and a halftone image in the following part and determining whether or not ghost (history development) of the solid patch image occurred in the halftone part. The evaluation criteria for the drum ghost were set to "excellent" when no drum ghost occurred, to "average" when slight drum ghost occurred but there was no practical problem and to "poor" when remarkable drum ghost occurred. The results of the evaluation of the image fog were shown in FIG. 6, and the results of the evaluation of the drum ghost were shown in Table 1.

TABLE 1

| ABSOLUTE HUMIDITY [g/m3] | | 1 | 5 | 10 | 15 | 20 | 25 | 30 |
|---|---|---|---|---|---|---|---|---|
| COMPARATIVE EXAMPLE | | poor | average | excellent | excellent | excellent | excellent | excellent |
| PRESENT | LESS THAN 62500 m | excellent | excellent | excellent | excellent | excellent | excellent | excellent |
| INVENTION | 62500 m OR ABOVE | excellent | excellent | excellent | excellent | excellent | excellent | excellent |

Figure 6:
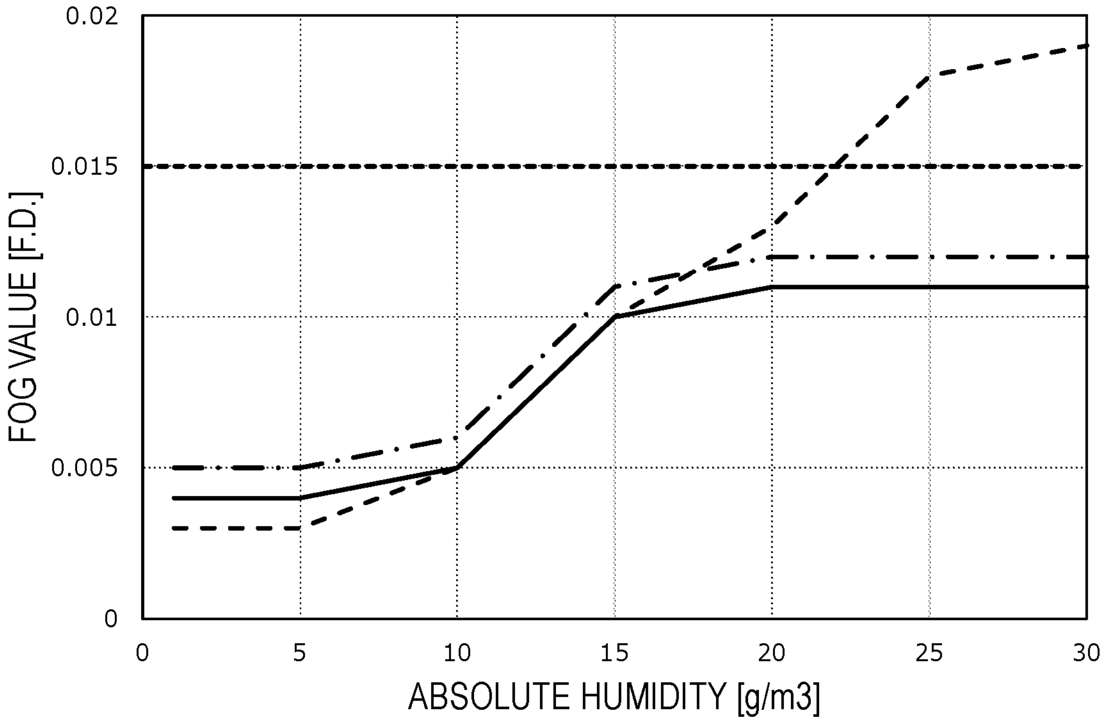
FIG. 6 is graph showing a change in fog value (FD) when the frequency of the alternating voltage Vac of the development voltage is changed according to the absolute humidity (the present disclosure) and a change in fog value (FD) when the frequency is not changed (Comparative Example).

As shown in FIG. 6, in the present disclosure in which as the absolute humidity was increased, the frequency of the alternating voltage Vac was increased, in each of a case where the cumulative drive distance of the photosensitive drums 1*a* to 1*d* was less than 65000 m (solid line in FIG. 6) and a case where the cumulative drive distance was equal to or greater than 65000 m (alternate long and short dashed line in FIG. 6), the fog value dropped below the standard value of 0.015 (dotted line in FIG. 6) in a range of 0 to 30 [g/m$^3$] for the absolute humidity.

By contrast, in Comparative Example (broken line in FIG. 6) in which the frequency of the alternating voltage Vac was not changed regardless of the absolute humidity, when the absolute humidity exceeded 20 [g/m$^3$], the fog value exceeded the standard value, and thus the image fog deteriorated.

As shown in Table 1, in the present disclosure in which as the absolute humidity was increased, the frequency of the alternating voltage Vac was increased, in each of the case where the cumulative drive distance of the photosensitive drums 1*a* to 1*d* was less than 65000 m and the case where the cumulative drive distance was equal to or greater than 65000 m, the occurrence of drum ghost was not recognized in a range of 0 to 30 [g/m$^3$] for the absolute humidity.

By contrast, in Comparative Example in which the frequency of the alternating voltage Vac was not changed regardless of the absolute humidity, when the absolute humidity was 5 [g/$m^3$], the occurrence of drum ghost was recognized. This is considered to be because on a side on which the absolute humidity was low, the surface potential of the photosensitive drums 1_a_ to 1_d_ was unstable, and in a state where the frequency of the alternating voltage Vac was high (developability was high), the drum ghost deteriorated.

It has been confirmed from the results described above that the frequency of the alternating voltage Vac is stepwise increased as the absolute humidity is increased, and thus it is possible to suppress the occurrence of image fog and drum ghost.

The present disclosure can be utilized for an image forming apparatus which includes a development device. By the utilization of the present disclosure, it is possible to provide an image forming apparatus which can suppress an image failure such as image fog or drum ghost regardless of the usage environment of the image forming apparatus and the degree of deterioration.

What is claimed is:

1. An image forming apparatus comprising:

an image carrying member in which a photosensitive layer is formed on a surface;

a charging device that charges the surface of the image carrying member;

an exposure device that exposes the surface of the image carrying member charged by the charging device to form an electrostatic latent image with charging attenuated;

a development device that includes a development container which stores a developer including a toner and a developer carrying member which is arranged in the development container and supplies, to the image carrying member, the toner in the developer stored in the development container, and develops the electrostatic latent image into a toner image;

a development voltage power supply that applies, to the developer carrying member, a development voltage with an alternating voltage superimposed on a direct voltage;

a humidity detection device that detects an absolute humidity around the development device; and a controller that controls drive of the development voltage power supply, wherein the controller stepwise increases a frequency of the alternating voltage as the absolute humidity detected by the humidity detection device is increased.

2. The image forming apparatus according to claim 1, wherein as the absolute humidity is increased, the controller stepwise increases the frequency of the alternating voltage from a first frequency lower than a reference frequency to a second frequency higher than the reference frequency.

3. The image forming apparatus according to claim 2, wherein when a cumulative drive distance of the image carrying member is less than a predetermined distance, the controller changes the frequency by first control that includes: a first section in which the frequency of the alternating voltage is stepwise increased from the first frequency to the reference frequency as the absolute humidity is increased; a second section in which the frequency of the alternating voltage is maintained at the reference frequency; and a third section in which the frequency of the alternating voltage is stepwise increased from the reference frequency to the second frequency in this order whereas when the cumulative drive distance of the image carrying member is equal to or greater than the predetermined distance, the controller changes the frequency by second control that stepwise increases the frequency of the alternating voltage from the first frequency lower than the reference frequency to the second frequency higher than the reference frequency as the absolute humidity is increased.

4. The image forming apparatus according to claim 3, wherein in the third section, a range of a change in the frequency relative to a change in the absolute humidity is greater than the range of the change in the frequency in the first section.

5. The image forming apparatus according to claim 1, wherein when a cumulative drive distance of the image carrying member is less than a predetermined distance, the controller decreases a range of a change in the frequency relative to a change in the absolute humidity as compared with the range of the change in the frequency when the cumulative drive distance is equal to or greater than the predetermined distance.

6. The image forming apparatus according to claim 1, wherein the controller changes, based on the absolute humidity detected by the humidity detection device, the frequency of the alternating voltage each time a print job is performed.

7. The image forming apparatus according to claim 1, wherein the developer is a two-component developer that includes the toner and a magnetic carrier.

* * * * *